US010620670B2

(12) United States Patent
Wilson et al.

(10) Patent No.: US 10,620,670 B2
(45) Date of Patent: *Apr. 14, 2020

(54) TOUCH SCREEN SHIELD

(71) Applicant: Racing Optics, Inc., Las Vegas, NV (US)

(72) Inventors: Stephen S. Wilson, Las Vegas, NV (US); Bart Wilson, Las Vegas, NV (US); Seth Wilson, Las Vegas, NV (US)

(73) Assignee: Racing Optics, Inc., Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/169,782

(22) Filed: Oct. 24, 2018

(65) Prior Publication Data

US 2019/0094914 A1 Mar. 28, 2019

Related U.S. Application Data

(63) Continuation of application No. 15/273,318, filed on Sep. 22, 2016, now abandoned, which is a
(Continued)

(51) Int. Cl.
*G06F 1/16* (2006.01)
*G06F 3/041* (2006.01)
(Continued)

(52) U.S. Cl.
CPC ............ *G06F 1/1656* (2013.01); *B32B 27/08* (2013.01); *B32B 27/36* (2013.01); *G06F 1/1637* (2013.01);
(Continued)

(58) Field of Classification Search
CPC .. B32B 7/06; B32B 7/12; B32B 7/045; B32B 3/06; B32B 2457/20; B32B 2457/208;
(Continued)

(56) References Cited

U.S. PATENT DOCUMENTS 3,948,662 A 4/1976 Alston et al.
3,950,580 A 4/1976 Boudet
(Continued)

FOREIGN PATENT DOCUMENTS

DE 19808535 9/1999
EP 1471415 10/2004
(Continued)

OTHER PUBLICATIONS

Prosecution History of Re-Examination U.S. Appl. No. 95/002,073 titled Touch Screen Protector; pp. 1-1,980.
(Continued)

*Primary Examiner* — Patricia L. Nordmeyer
(74) *Attorney, Agent, or Firm* — Stetina Brunda Garred & Brucker

(57) ABSTRACT

A shield that is attachable to a touch sensitive screen is disclosed. The shield may be attached to the touch sensitive screen only at its outer peripheral portion. An air gap is enclosed between the shield and the touch sensitive screen to form a planar air bearing. The shield preferably does not touch the active area of the touch sensitive screen when the user is not touching the shield but only viewing the touch sensitive screen through the shield. This mitigates unwanted optical artifacts such as trapped air bubbles, Newton rings and chromatic interference while maintaining the sensitivity of the touch sensitive screen.

21 Claims, 10 Drawing Sheets

Related U.S. Application Data continuation-in-part of application No. 14/794,156, filed on Jul. 8, 2015, now Pat. No. 10,345,934, which is a continuation of application No. 12/780,443, filed on May 14, 2010, now Pat. No. 9,128,545.

(51) Int. Cl.
  *B32B 27/08* (2006.01)
  *B32B 27/36* (2006.01)
  *B29C 63/02* (2006.01)

(52) U.S. Cl.
  CPC ............ *G06F 3/041* (2013.01); *B29C 63/02* (2013.01); *B32B 2307/402* (2013.01); *B32B 2307/404* (2013.01); *B32B 2307/41* (2013.01); *B32B 2307/412* (2013.01); *B32B 2307/518* (2013.01); *B32B 2307/546* (2013.01); *B32B 2405/00* (2013.01); *B32B 2451/00* (2013.01); *B32B 2457/20* (2013.01); *B32B 2457/208* (2013.01); *B32B 2571/00* (2013.01); *G06F 2203/04103* (2013.01); *G06F 2203/04107* (2013.01); *Y10T 156/10* (2015.01); *Y10T 156/1052* (2015.01); *Y10T 428/14* (2015.01); *Y10T 428/1471* (2015.01); *Y10T 428/239* (2015.01); *Y10T 428/24331* (2015.01); *Y10T 428/24744* (2015.01)

(58) Field of Classification Search
  CPC . B32B 2571/00; G06F 1/1633; G06F 1/1626; G06F 3/041; G06F 3/0418; G06F 3/0412; G06F 3/0414; G06F 2203/04105; G06F 2203/04107; G06F 2203/04103; B29C 63/02; Y10T 156/10; Y10T 156/1052; Y10T 428/14; Y10T 428/1471; Y10T 428/239; Y10T 428/24331; Y10T 428/24744
  See application file for complete search history.

(56) References Cited

U.S. PATENT DOCUMENTS

| | | |
|---|---|---|
| 3,987,569 A | 10/1976 | Chase |
| 4,076,373 A | 2/1978 | Moretti |
| 4,138,746 A | 2/1979 | Bergmann |
| 4,204,231 A | 5/1980 | Permenter |
| 4,696,860 A | 9/1987 | Epperson |
| 4,716,601 A | 1/1988 | McNeal |
| 4,889,754 A | 12/1989 | Vargas |
| 4,907,090 A | 3/1990 | Ananian |
| 5,364,671 A | 11/1994 | Gustafson |
| 5,420,649 A | 5/1995 | Lewis |
| 5,486,883 A | 1/1996 | Candido |
| RE35,318 E | 8/1996 | Warman |
| 5,592,698 A | 1/1997 | Woods |
| 5,668,612 A | 9/1997 | Hung |
| 5,671,483 A | 9/1997 | Reuber |
| 5,740,560 A | 4/1998 | Muoio |
| 5,896,991 A | 4/1999 | Hippely et al. |
| 5,937,596 A | 8/1999 | Leeuwenburgh et al. |
| 6,085,358 A | 7/2000 | Cogan |
| 6,250,765 B1 | 6/2001 | Murakami |
| 6,305,073 B1 | 10/2001 | Badders, Jr. |
| 6,388,813 B1 | 5/2002 | Wilson et al. |
| 6,469,752 B1 | 10/2002 | Ishikawa et al. |
| 6,536,045 B1 | 3/2003 | Wilson et al. |
| 6,536,589 B2 | 3/2003 | Chang |
| 6,555,235 B1 | 4/2003 | Auderferheide et al. |
| 6,559,902 B1 | 5/2003 | Kusuda et al. |
| 6,592,950 B1 | 7/2003 | Toshima et al. |
| 6,614,423 B1 | 9/2003 | Wong et al. |
| 6,654,071 B2 | 11/2003 | Chen |
| 6,660,389 B2 | 12/2003 | Liu et al. |
| 6,667,738 B2 | 12/2003 | Murphy |
| 6,750,922 B1 | 6/2004 | Benning |
| 6,777,055 B2 | 8/2004 | Janssen et al. |
| 6,800,378 B2 | 10/2004 | Hawa et al. |
| 6,841,190 B2 | 1/2005 | Liu et al. |
| 6,864,882 B2 | 3/2005 | Newton |
| 6,879,319 B2 | 4/2005 | Cok |
| 6,995,976 B2 | 2/2006 | Richardson |
| 7,070,837 B2 | 7/2006 | Ross |
| 7,071,927 B2 | 7/2006 | Blanchard |
| 7,226,176 B1 | 6/2007 | Huang |
| 7,351,470 B2 | 4/2008 | Draheim et al. |
| 7,495,895 B2 | 2/2009 | Carnevali |
| 7,629,052 B2 | 12/2009 | Brumwell |
| 7,957,524 B2 | 6/2011 | Chipping |
| 8,044,942 B1 | 10/2011 | Leonhard et al. |
| 8,294,843 B2 | 10/2012 | Rollaway |
| 8,974,620 B2 | 3/2015 | Wilson et al. |
| 9,104,256 B2 | 8/2015 | Wilson et al. |
| 9,128,545 B2 | 9/2015 | Wilson et al. |
| 2002/0025441 A1 | 2/2002 | Hieda et al. |
| 2002/0101411 A1 | 8/2002 | Chang |
| 2002/0114934 A1 | 8/2002 | Liu et al. |
| 2002/0122925 A1 | 9/2002 | Liu et al. |
| 2002/0195910 A1 | 12/2002 | Hus et al. |
| 2003/0012936 A1 | 1/2003 | Draheim et al. |
| 2003/0087054 A1 | 5/2003 | Janssen et al. |
| 2003/0110613 A1 | 6/2003 | Ross |
| 2004/0004605 A1 | 1/2004 | David |
| 2004/0109096 A1 | 6/2004 | Anderson et al. |
| 2004/0121105 A1 | 6/2004 | Janssen et al. |
| 2004/0227722 A1 | 11/2004 | Friberg et al. |
| 2006/0024494 A1 | 2/2006 | Amano |
| 2006/0114245 A1 | 6/2006 | Masters et al. |
| 2007/0181456 A1 | 8/2007 | Kusuda et al. |
| 2007/0211002 A1 | 9/2007 | Zehner et al. |
| 2007/0212508 A1 | 9/2007 | Mase |
| 2007/0229962 A1 | 10/2007 | Mason, Jr. |
| 2008/0030631 A1 | 2/2008 | Gallagher |
| 2008/0055258 A1 | 3/2008 | Sauers |
| 2009/0054115 A1 | 2/2009 | Horrdin et al. |
| 2009/0086415 A1 | 4/2009 | Chipping |
| 2009/0087655 A1 | 4/2009 | Yamada et al. |
| 2010/0026646 A1 | 2/2010 | Xiao et al. |
| 2010/0033442 A1 | 2/2010 | Kusuda |
| 2010/0102197 A1 | 4/2010 | McIntyre |
| 2010/0238119 A1 | 9/2010 | Dubrovsky et al. |
| 2010/0245273 A1 | 9/2010 | Hwang et al. |
| 2010/0270189 A1 | 10/2010 | Padersen, II et al. |
| 2011/0012841 A1 | 1/2011 | Lin |
| 2011/0267793 A1 | 3/2011 | Cohen et al. |
| 2011/0279383 A1 | 11/2011 | Wilson et al. |
| 2012/0003431 A1 | 1/2012 | Huang |
| 2012/0183712 A1 | 7/2012 | Leonhard et al. |
| 2012/0188743 A1 | 7/2012 | Wilson et al. |
| 2015/0309609 A1 | 10/2015 | Wilson et al. |

FOREIGN PATENT DOCUMENTS

| | | |
|---|---|---|
| JP | 4314537 | 11/1992 |
| JP | 2002328613 | 11/2002 |
| JP | 2014032222 | 2/2014 |
| JP | 2015128896 | 7/2015 |
| KR | 20120001292 | 1/2012 |
| TW | 200700793 | 1/2007 |
| TW | 2012027992 | 7/2010 |
| WO | WO03052678 | 6/2003 |

OTHER PUBLICATIONS www.store.moshimode.com; "iVisor AG for iPad 2 Black"; 2004-2010.

Defendant's Motion for Summary Judgment; Oct. 25, 2013; pp. 1-31.

Jake Gaecke; "Appletell Reviews the iVisor for iPad"; www.appletell.com; Sep. 15, 2010 at 12:32 p.m. www.technologytell.com/apple/60407/appletell-reviews-ag-for-ipad/; 2 pages.

(56) References Cited

OTHER PUBLICATIONS www.nushield.com/technology.php; "What Makes NuShield Screen Protectors Superior", 2 pages.
www.spigen.com; "Something You Want"; 2 pages.
www.zagg.com; "Apple iPad 2 (Wi-Fi 3G) Screen Protector"; 2 pages.
www.gadgetguard.com; "Invisible Gadget Guard, the Original"; 1 page.
www.incipotech.com; "Protect Your iPhone 4 with Screen Protectors from Incipo"; 3 pages.
www.store.moshimonde.com; "iVisor AG iPad Screen Protector"; Jul. 2010; 7 pages.
www.store.moshimonde.com; "iVisor XT Crystal Clear Protector for iPad"; Aug. 2010; 3 pages.
www.store.moshimonde.com; "iVisor AG for iPad 2 Black"; Mar. 2011; 5 pages.
www.store.moshimonde.com; "iVisor AG for iPad 2 White"; Mar. 2011; 3 pages.
www.store.moshimonde.com; "iVisor AG for iPhone 4/4S Black"; Nov. 2010; 5 pages.
www.store.moshimonde.com; "iVisor AG for iPhone 4/4S White"; May 2010; 4 pages.
English translation of TW201027992; "Monitor Protection Device for a Flat Panel Display"; 11 pages.
*Racing Optics, Inc.* v. *Aevoe, Inc., d/b/a/ Moshi*; Case No. 15-cv-017744-JCM-VCF; Aevoe's Initial Disclosure Non-Infringement, Invalidity and Unenforceability Contentions (Redacted) dated Jan. 7, 2016.
Defendant Aevoe Corp.'s Non-Infringement Contentions and Responses to Racing Optic's Disclosure of Asserted Claims and Infringement Contentions (U.S. Pat. No. 9,128,545) dated Jan. 7, 2016.
Defendant Aevoe Corp.'s Non-Infringement Contentions and Responses to Racing Optic's Disclosure of Asserted Claims and Infringement Contentions (U.S. Pat. No. 9,104,256) dated Jan. 7, 2016.
Defendant Aevoe Corp.'s Non-Infringement Contentions and Responses to Racing Optic's Disclosure of Asserted Claims and Infringement Contentions (U.S. Pat. No. 8,974,620) dated Jan. 7, 2016.
*I-Blason LLC* v. *Aevoe, Inc. and Aevoe Corp.*; Case IPR2016-TBA; Petition for Inter Partes Review of U.S. Pat. No. 8,044,942 (including Exhibits 1001-1019).
*Racing Optics, Inc.* v. *Aevoe Corp. DBA Moshi*; Case 2:15-cv-01774-RCJ-VCF; "Answer to Aevoe's Counterclaims—Jury Trial Demanded"; Nov. 2, 2015; 15 pages.
Gregory Brower et al.; "Complaint for Patent Infringement"; Sep. 15, 2015; 15 pages.
Jeffrey A. Silverstri et al.; "Answer to Complaint for Patent Infringement"; Oct. 7, 2015; 34 pages.
United States Patent and Trademark Office; Office Action for U.S. Appl. No. 15/090,681; dated Aug. 26, 2016; 8 pages.
List of References cited by applicant and considered by Examiner for U.S. Appl. No. 15/090,681; dated Jun. 30, 2016; 3 pages.
List of References cited by applicant and considered by Examiner for U.S. Appl. No. 15/090,681; dated Apr. 27, 2016; 4 pages.
Examiner's search strategy and results for U.S. Appl. No. 15/090,681; dated Aug. 21, 2016; 2 pages.
*Aevoe Corp.* v. *Racing Optics, Inc.*; Case No. IPR2016-01164; Petition for Inter Partes Review of U.S. Pat. No. 9,104,256 (including Exhibits 1001-1011 and Petitioner Power of Attorney Pursuant to 37 C.F.R. 42. 10(b) for Petition for Inter Partes Review); Jun. 21, 2016.
*Aevoe Corp.* v. *Racing Optics, Inc.*; Case No. IPR2016-01165; Petition for Inter Partes Review of U.S. Pat. No. 9,128,545(including Exhibits 1001-1006 and Petitioner Power of Attorney Pursuant to 37 C.F.R. 42. 10(b) for Petition for Inter Partes Review); Jun. 21, 2016.
*Aevoe Corp.* v. *Racing Optics, Inc.*; Case No. IPR2016-01166; Petition for Inter Partes Review of U.S. Pat. No. 9,274,625 (including Exhibits 1001-1011 and Petitioner Power of Attorney Pursuant to 37 C.F.R. 42. 10(b) for Petition for Inter Partes Review); Jun. 21, 2016.

Exhibit 1—Invalidity Contentions re: '545 Patent Under LPR 1-8(b)-(d); at least as early as Jul. 1, 2016.
Exhibit 2—Invalidity Contentions re: '256 Patent Under LPR 1-8(b)-(d); at least as early as Jul. 1, 2016.
Exhibit 3—Invalidity Contentions re: '620 Patent Under LPR 1-8(b)-(d); at least as early as Jul. 1, 2016.
Exhibit 4—Invalidity Contentions re: '625 Patent Under LPR 1-8(b)-(d); at least as early as Jul. 1, 2016.
Exhibit 1002—U.S. Pat. No. 5,364,671 to Gustafson; Case IPR2016-01745; Inter Partes Review of U.S. Pat. No. 8,974,620; at least as early as Sep. 7, 2016; pp. 1-6.
Exhibit 1004—U.S. Pat. No. 7,351,470 to Draheim et al; Case IPR2016-01745; Inter Partes Review of U.S. Pat. No. 8,974,620; at least as early as Sep. 7, 2016; pp. 1-15.
Exhibit 1001—U.S. Pat. No. 8,974,620 to Wilson et al.; Case IPR2016-01745; Inter Partes Review of U.S. Pat. No. 8,974,620; at least as early as Sep. 7, 2016; pp. 1-15.
Exhibit 1003—U.S. Pat. No. 6,250,765 to Murakami; Case IPR2016-01745; Inter Partes Review of U.S. Pat. No. 8,974,620; at east as early as Sep. 7, 2016; p. 1-8.
Exhibit 1005—U.S. Pat. No. 7,957,524 to Chipping; Case IPR2016-01745; Inter Partes Review of U.S. Pat. No. 8,974,620; at east as early as Sep. 7, 2017; pp. 1-20.
Aevoe Corp., Racing Optics, Inc.; Petition for Inter Partes Review; Case IPR2016-01745; Inter Partes Review of U.S. Pat. No. 8,974,620; at least as early as Sep. 7, 2016; pp. 1-55.
Exhibit 1006—Japanese Application No. JP 2002-328613 to Kitaguchi Translation; IPR2016-01745; at least as early as Sep. 7, 2016; pp. 1-10.
Exhibit 1009—U.S. Appl. No. 13/838,311; Interview Summary; Case IPR2016-01745; Inter Partes Review of U.S. Pat. No. 8,974,620; at least as early as Sep. 7, 2016; p. 1-3.
Exhibit 1010—U.S. Appl. No. 15/838,311; Notice of Allowance; Case IPR2016-01745; Inter Partes Review of U.S. Pat. No. 8,974,620; at least as early as Sep. 7, 2016; pp. 1-8.
*Aevoe Corp.* v. *Racing Optics, Inc.*; Declaration of Darran Cairns; Case IPR2016-01745; Inter Partes Review of U.S. Pat. No. 8,974,620; at least as early as Sep. 7, 2016; pp. 1-32.
*Aevoe Corp.* v. *Racing Optics, Inc.*; Petitioner's Power of Attorney; Case IPR2016-01745; Inter Partes Review of U.S. Pat. No. 8,974,620; at least as early as Sep. 7, 2016; pp. 1-3.
Exhibit 1007—U.S. Appl. No. 13/838,311; Response to Office Action; Case IPR2016-01745; Inter Partes Review of U.S. Pat. No. 8,974,620; at least as early as Sep. 7, 2016; p. 1-19.
Exhibit 1008—U.S. Appl. No. 13/838,311; Response and Request for Continued Examination; Case IPR2016-01745; Inter Partes Review of U.S. Pat. No. 8,974,620; at least as early as Sep. 7, 2016; pp. 1-21.
*Aevoe Corp.* v. *Racing Optics, Inc.*; Mandatory Notices; Case IPR2016-01745; Inter Partes Review of U.S. Pat. No. 8,974,620; at least as early as Sep. 7, 2016; pp. 1-4.
*Aevoe Corp.* v. *Racing Optics, Inc.*;Power of Attorney; Case IPR2016-01745; Inter Partes Review of U.S. Pat. No. 8,974,620; at least as early as Sep. 7, 2016; pp. 1-4.
*Aevoe Corp* v. *Racing Optics, Inc.*; Notice of Filing Date; Case IPR2016-01745; Inter Partes Review of U.S. Pat. No. 8,974,620; at least as early as Sep. 6, 2016; p. 1-5.
*Aevoe Corp* v. *Racing Optics, Inc.*; Decision; Case IPR2016-01164; Inter Partes Review of U.S. Pat. No. 9,104,256; at least as early as Nov. 7, 2016; p. 1-24.
*Aevoe Corp* v. *Racing Optics, Inc.*; Decision; Case IPR2016-01166; Inter Partes Review of U.S. Pat. No. 9,274,625; at least as early as Nov. 7, 2016; p. 1-23.
*Aevoe Corp* v. *Racing Optics, Inc.*; Decision; Case IPR2016-01165; Inter Partes Review of U.S. Pat. No. 9,128,545; at least as early as Nov. 7, 2016; p. 1-25.
English translation of JP 2014-032222A (see foreign reference).
United States Patent and Trademark Office; Office Action dated Dec. 21, 2016 pertaining to U.S. Appl. No. 15/090,681, filed Apr. 5, 2016; 8 pages.

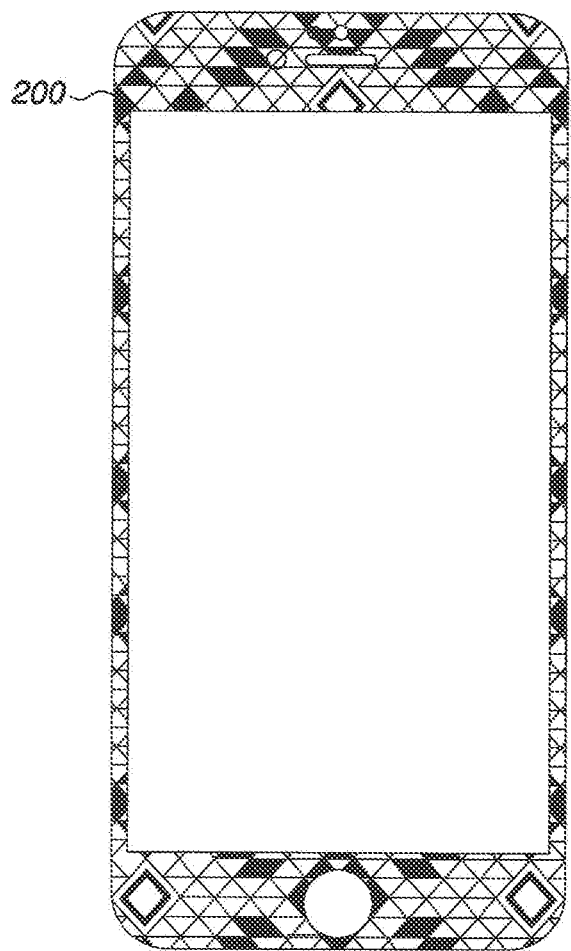
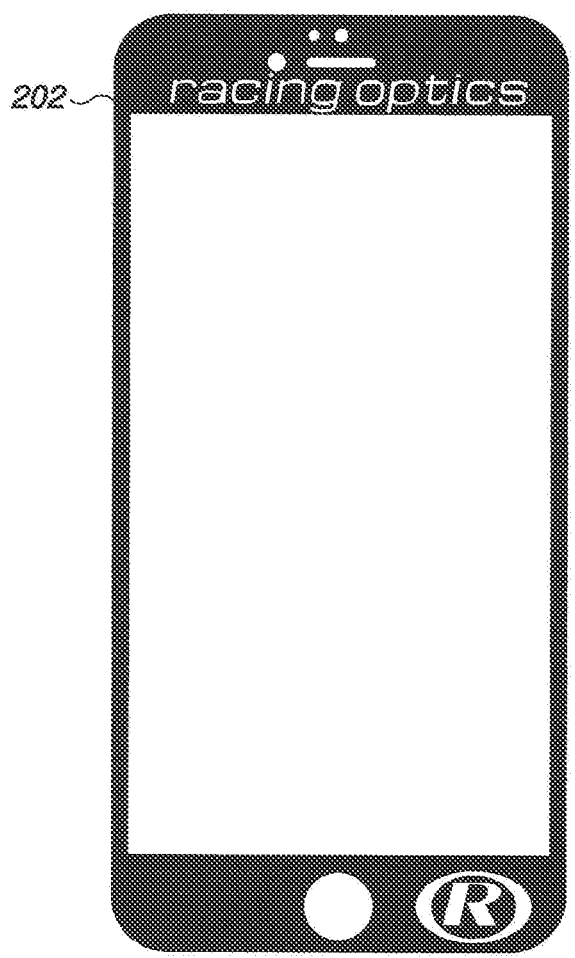
*FIG. 12A*  *FIG. 12B*

TOUCH SCREEN SHIELD

CROSS-REFERENCE TO RELATED APPLICATIONS

The present application is a continuation of U.S. patent application Ser. No. 15/273,318, filed on Sep. 22, 2016, which is a continuation-in-part of U.S. patent application Ser. No. 14/794,156, filed on Jul. 8, 2015, which is a continuation patent application of U.S. patent application Ser. No. 12/780,443 (Now U.S. Pat. No. 9,128,545), filed on May 14, 2010, which applications are both incorporated by reference.

STATEMENT RE: FEDERALLY SPONSORED RESEARCH/DEVELOPMENT

Not Applicable

BACKGROUND

The present invention relates to transparent films applied to touch sensitive screens for impact and/or scratch protection.

Electronic devices such as the iPhone have a touch sensitive screen by which the user may operate the electronic device. The touch sensitive screen displays electronic buttons and search boxes that the user can select by touch. These touch sensitive screens are very large and subject to cracking and scratching during normal use by the user as well as when the electronic device is dropped. The resulting damage may be costly to repair and may require replacement of the entire electronic device or phone. Accordingly, there is a need for a low cost device that will cushion and absorb an impact that could break or scratch the glass face of the electronic device and yet not interfere with the functionality and sensitivity of the touch screen or the quality of the image displayed on the screen.

Prior art films do exist that are adhered to the touch sensitive screen. Unfortunately, these protective films leave unsightly air bubbles between the transparent protective film and the transparent glass of the electronic device. Moreover, these films provide no impact absorption protection to the glass face.

Based on the foregoing, there is a need in the art for an improved protective film for touch sensitive screens.

BRIEF SUMMARY

The touch screen shield disclosed herein addresses the needs discussed above, discussed below and those that are known in the art.

The touch screen shield disclosed herein may comprise a base transparent layer that is attached to a touch sensitive screen of an electronic device. A planar air bearing may be formed between the base transparent layer and the touch sensitive screen by attaching only the outer peripheral portion of the base transparent layer to the touch sensitive screen. The air gap may be continuous and planar between the base transparent layer and the touch sensitive screen by adhering a protective liner to the underside of the base transparent layer. The protective liner has an outer periphery which is smaller than the outer periphery of the base transparent layer so as to form a step. When the outer peripheral portion of the base transparent layer is adhered to the touch sensitive screen, the base transparent layer is placed into tension by the step thereby lifting the protective liner above and off of the touch sensitive screen. Additionally, the adhesive surrounding the base transparent layer forms an enclosed air gap and traps air between the base transparent layer and the touch sensitive screen. These factors promote formation of the planar air bearing between the base transparent layer and the touch sensitive screen.

The air gap between the base transparent layer and the touch sensitive screen may also be formed by forming a thick adhesive layer at the outer peripheral portion of the base transparent layer. The adhesive is sufficiently thick so that the base transparent layer is lifted off of the touch sensitive screen when the touch screen shield is mounted to the electronic device.

It is also contemplated that in any of the embodiments discussed herein of the shield, one or more sacrificial layers may be mounted on top of the base transparent layer. The sacrificial layers may be removed one at a time from top to bottom as the top most sacrificial layer is damaged. The additional layers provide additional impact protection and retains flexibility so that touch sensitivity of the touch sensitive screen is not compromised.

It is also contemplated that the shield may be formed with an opaque border (e.g., black, pattern, etc.) to hide air bubbles that might form between the outer peripheral portion of the base transparent layer and the touch sensitive screen.

More particularly, a transparent shield for a touch sensitive screen of a device is disclosed. The shield may comprise a first transparent layer, a thin layer of pressure sensitive adhesive and a second transparent layer. The first transparent layer may define opposed first and second sides. The first transparent layer may also define an outer periphery. The thin layer of pressure sensitive adhesive may be disposed on an outer peripheral portion of the second side of the first transparent layer. The second transparent layer may define opposed first and second sides. The first side of the second transparent layer may be attached to a central portion of the second side of the first transparent layer. An outer periphery of the second transparent layer may be smaller than the outer periphery of the first transparent layer so as to define a step.

The outer peripheral portion of the first transparent layer may be attached to the device so that the central portion of the second side of the first transparent layer is positioned on top of the touch sensitive screen of the device. The first transparent layer may be placed in tension when the outer peripheral portion of the first transparent layer is attached to the device.

The shield may further comprise adhesive disposed between the central portion of the second side of the first transparent layer and the second transparent layer for attaching the first and second transparent layer to each other. The adhesive disposed on the outer peripheral portion of the second side of the first transparent layer may be protected by a removable liner. The adhesive may form an enclosed air gap between the shield and touch sensitive screen. The enclosed air gap may form a planar air bearing.

The shield may further comprise one or more transparent sacrificial layers peelably removable from each other and the first side of the first transparent layer so that a top most sacrificial layer may be removed as desired. The first and second transparent layers may be thicker compared to the one or more sacrificial layers. The sacrificial layers may have staggered tabs for assisting in the peeling of the top most sacrificial layer. A peel value between the sacrificial layers may be progressively stronger as the top most sacrificial layer is peeled away.

The adhesive and the first and second transparent layers may have a difference in index of refraction less than 0.2.

The shield may further comprise an opaque annular film at an outer peripheral portion of the first transparent layer.

Moreover, a transparent shield for a touch sensitive screen of a device is disclosed. The shield may comprise a first transparent layer and a pressure sensitive adhesive. The first transparent layer may define opposed first and second sides. The pressure sensitive adhesive may be disposed only at an outer peripheral portion of the second side of the first transparent layer. The pressure sensitive adhesive may be sufficiently thick so as to form an air gap between the first transparent layer and the touch sensitive screen when the shield is mounted to the electronic device. The air gap may be a planar air bearing.

The outer peripheral portion of the first transparent layer may be attached to the device so that the central portion of the second side of the first transparent layer is positioned on top of the touch sensitive screen of the device.

The shield may further comprise one or more transparent sacrificial layers peelably removable from each other and the first side of the first transparent layer so that a top most sacrificial layer may be removed as desired.

The shield may further comprise an opaque annular film at an outer peripheral portion of the first transparent layer.

BRIEF DESCRIPTION OF THE DRAWINGS

These and other features and advantages of the various embodiments disclosed herein will be better understood with respect to the following description and drawings, in which like numbers refer to like parts throughout, and in which:

FIGS. 12A and B show examples of annular layers with printed patterns for use with a shield.

DETAILED DESCRIPTION

Figure 1:
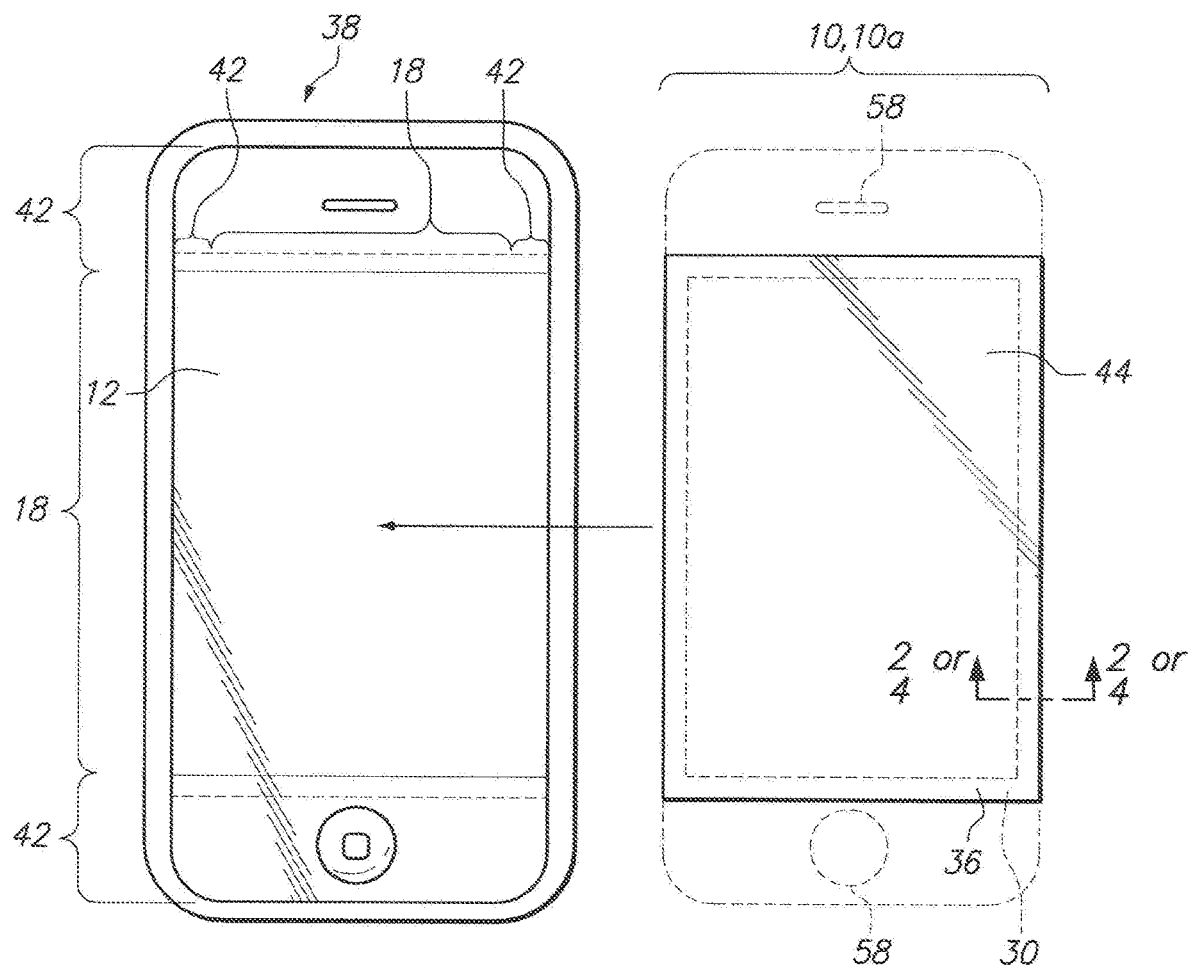
FIG. 1 is an exploded top view of an electronic device with a shield mountable thereon.

Referring now to the drawings, a shield 10 for a touch sensitive screen 12 is shown. The shield 10 protects the touch sensitive screen 12 from scratches, impacts, etc. The shield 10 is damaged instead of the touch sensitive screen 12. When the shield 10 is scratched, dented, etc. to a degree that makes viewing the touch sensitive screen 12 unacceptable for the user, the shield 10 may be replaced with a new shield 10. Optionally, the shield 10 may have one or more sacrificial layers 14 which may be individually peeled off from each other starting from the top most layer going down to the base shield 10 as the top most sacrificial layer 14 is damaged. The sacrificial layers 14a-h may be mounted on top of the shield 10, 10a. When the shield 10 is attached to the touch sensitive screen 12, an air gap 16 (see FIG. 3) may be formed between the shield 10 and an active area 18 of the touch sensitive screen 12. The air gap 16 eliminates unwanted optical artifacts such as trapped area bubbles, Newton rings and chromatic interference while maintaining the sensitivity of the touch sensitive screen 12.

Figure 2:
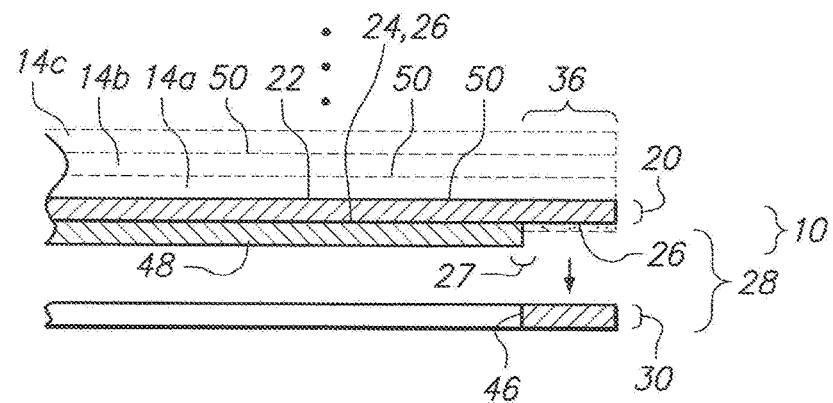
FIG. 2 is a cross sectional view of the shield shown in FIG. 1.
Figure 3:
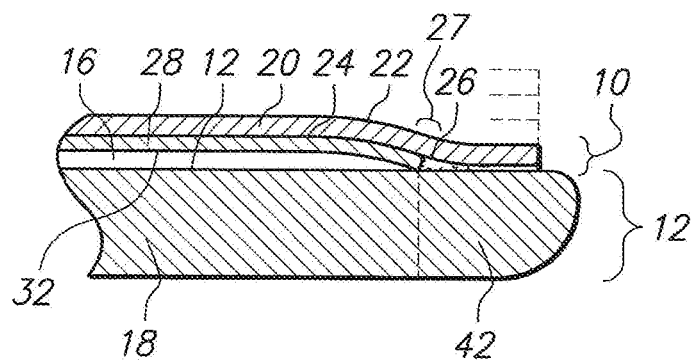
FIG. 3 is a cross sectional view of the shield mounted to the electronic device shown in FIG. 1.

The air gap 16 may be formed by providing a base transparent layer 20 which defines an exposed side 22 and an interior side 24 (see FIG. 3). The interior side 24 may be coated with a pressure sensitive adhesive 26 (e.g., acrylic adhesive). The pressure sensitive adhesive 26 may cover the entire interior side 24 of the base transparent layer 20. A protective liner 28 may cover the pressure sensitive adhesive 26 coated on the interior side 24 and be attached to the protective liner 28. When the shield 10 is ready to be mounted to the touch sensitive screen 12, an outer peripheral portion 30 (see FIG. 2) or annulus of the protective liner 28 may be removed from the base transparent layer 20 to expose the adhesive 26 only at the outer peripheral portion of the base transparent layer 20 on the interior side 24. A step 27 (see FIGS. 2 and 3) is formed at the outer peripheral edge of the protective liner 28. The shield 10 may be attached to the touch sensitive screen 12 as shown in FIG. 3. More particularly, the entire outer periphery of the base transparent layer 20 may be adhered to the touch sensitive screen 12 so as to form an enclosed air gap 16 and form a planar air bearing. The base transparent layer 20 is tensioned about the step 27. Since an interior side 32 (see FIG. 3) of the protective liner 28 does not have any adhesive, a continuous air gap 16 may be formed between the protective liner 28 and the exposed side 34 of the touch sensitive screen 12.

Figure 4:
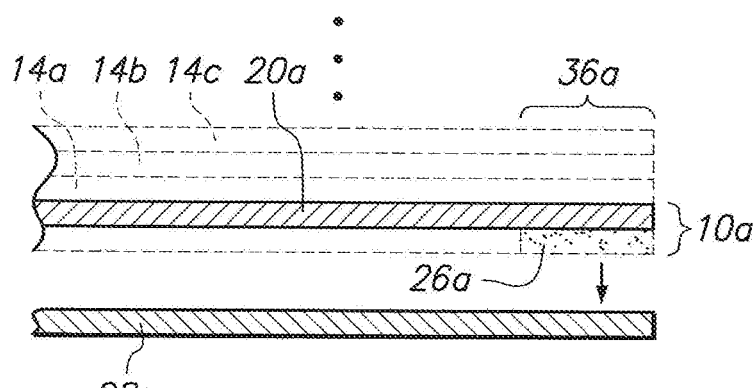
FIG. 4 is a cross sectional view of a second embodiment of the shield shown in FIG. 1.
Figure 5:
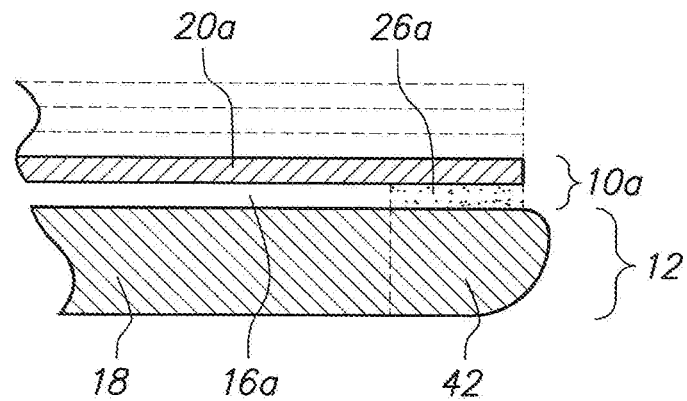
FIG. 5 is a cross sectional view of the second embodiment of the shield and the electronic device shown in FIG. 1.

Alternatively, a base transparent layer 20a may be provided with an adhesive 26a only on the outer peripheral portion 36 of the base transparent layer 20a, as shown in FIG. 4. The shield 10 may be attached to the touch sensitive screen 12 by way of the adhesive 26a, as shown in FIG. 5. The adhesive 26a may be sufficiently thick such that upon adhesion of the base transparent layer 20a to the touch sensitive screen 12, air gap 16a is formed, as shown in FIG. 5.

Moreover, it is contemplated that an opaque film 52 (see FIGS. 6-8) may be disposed at the outer peripheral portion 36 of the base transparent layer 20 to hide any air bubbles 60 that might form between the outer peripheral portion 36 of the base transparent layer 20 and the touch sensitive screen 12.

More particularly, referring now back to FIG. 1, an electronic device 38 such as an iPhone is shown. It is also contemplated that the electronic device 38 may be any type of visual display for photographs, video, etc. The electronic device 38 may have a touch sensitive screen 12 which allows a user to operate the electronic device 38. The touch sensitive screen 12 may define an active area 18. In the active area 18, the user may depress various electronic buttons, keys, etc. electronically displayed on the active area 18 to operate the electronic device 38 so as to play video, navigate, start applications, etc. The active area 18 may be disposed adjacent or enclosed within an inactive area 42.

The active area 18 of the touch sensitive screen 12 may be protected by disposing the shield 10 over the touch sensitive screen 12. To this end, the shield 10 may be adhered to the touch sensitive screen 12 wherein only the outer peripheral portion of the shield 10 is adhered to the touch sensitive screen 12. A continuous air gap 16 may exist between the central portion 44 of the shield 10 and the touch sensitive screen 12. Preferably, the adhesive 26 used to adhere the outer peripheral portion of the shield 10 to the touch sensitive screen 12 contacts only the inactive area 42. However, it is also contemplated that the adhesive 26 may adhere the shield 10 also to an outer peripheral portion of the active area 18.

Referring now to FIGS. 2 and 3, the shield 10 may comprise the base transparent layer 20. The base transparent layer 20 may be fabricated from a transparent material (e.g., biaxially-oriented polyethylene terephalate material (boPET), etc.). The base transparent layer 20 may be approximately 4 mil thick (i.e., 0.004"). Adhesive 26 may be coated on a majority, if not the entire, interior side 24 of the base transparent layer 20. To protect the adhesive 26 from dirt and grime prior to installation on the touch sensitive screen, the protective liner 28 may cover the entire interior side 24 of the base transparent layer 20. The adhesive 26 attaches the protective liner 28 to the base transparent layer 20. A cut or slit 46 may be made through the protective liner 28 so as to define an outer peripheral portion 30 or annulus of the protective liner 28 and a central portion 48 of the protective liner 28. The cut or slit 46 may be made with a rotary die, steel rule die, lasers or other methods known in the art.

When the user is ready to attach the shield 10 to the touch sensitive screen 12 of the electronic device 38, the user removes the outer peripheral portion 30 of the protective liner 28 from the shield 10 as shown in FIG. 2. For example, the user may apply a small piece of tape to the outer peripheral portion 30 and peel the outer peripheral portion 30 off of the base transparent layer 20. This exposes the adhesive 26 only at the outer peripheral portion 36 of the base transparent layer 20. This exposes the adhesive 26 only at the outer peripheral portion 36 of the base transparent layer 20. This also creates the step 27 between the protective layer 28 still remaining on the base transparent layer 20 and the base transparent layer 20. The user aligns the shield 10 to the touch sensitive screen 12 and applies pressure to the outer peripheral portion 36 of the base transparent layer 20 so that the adhesive 26 adheres the base transparent layer 20 to the touch sensitive screen 12. Preferably, the adhesive 26 is disposed only on the inactive area 42 of the touch sensitive screen 12. The adhesive 26 traps air between the base transparent layer 20 and the touch sensitive screen 12 to form the enclosed air gap 16. Also, the air gap 16 (see FIG. 3) may define a planar air bearing due to tension applied to the base transparent layer 20 about the step 27. The enclosed air gap 16 and the tension lifts the shield 10 off of active area 18 to form a planar air bearing to mitigate unwanted optical artifacts such as trapped air bubbles, Newton rings, and chromatic interference while maintaining the sensitivity of the touch screen. It is also contemplated that the adhesive 26 may be disposed on a portion of the active area 18 at the outer peripheral portion of the active area 18. In this manner, a majority of the active area 18 has an air gap 16 between the touch sensitive screen 12 and the shield 10.

Optionally, the shield 10 may have one or more sacrificial layers 14a-n. The sacrificial layers 14 may be adhered to each other by way of a peelable adhesive disposed between each of the sacrificial layers 14 as well as a bottommost sacrificial layer 14a and the exposed side 22 of the base transparent layer 20. During use of the electronic device 38, the topmost sacrificial layer 14c may become dented, scratched, etc. or otherwise damaged such that viewing through the shield 10 may be unacceptable. At this point, the topmost sacrificial layer 14c may be removed (e.g., peeled) from the shield 10. This uncovers a fresh, clean sacrificial layer 14b. The other sacrificial layers 14b and 14a may be removed top-down as the topmost sacrificial layer 14 becomes damaged. There may be one or more sacrificial layers 14a-n or stack of sacrificial layers 14a-n adhered to the base transparent layer 20. Preferably, there are between two (2) to ten (10) sacrificial layers 14a-n. The sacrificial layers 14a-n may be fabricated from a transparent material such as biaxially-oriented polyethelene terephalate (boPET).

Referring now to a second embodiment shown in FIGS. 4 and 5, a shield 10a may comprise base transparent layer 20a. A thick coat of adhesive 26a may be applied only to the underside of the outer peripheral portion 36a of the base transparent layer 20a. Protective liner 28a may be placed over the thick adhesive coating 26a to protect the adhesive 26a from dirt and grime up until prior to installation of the shield 10a to the touch sensitive screen 12. After removing the protective liner 28a from the shield 10a, the shield 10a is aligned to the touch sensitive screen 12. In particular, the adhesive 26a is preferably aligned to the inactive area 42 of the touch sensitive screen. Air gap 16a is formed between the base transparent layer 20a and the touch sensitive screen 12. The thick adhesive 26a lifts the base transparent layer 20a off the active area 40 to form the planar air bearing, as shown in FIG. 5.

Optionally, one or more sacrificial layers 14a-n as discussed above in relation to FIGS. 2 and 3 may be mounted to the shield 10a. The sacrificial layers 14a-n may be removed one by one as the topmost sacrificial layer is damaged (e.g., dented, scratched, etc.).

Figure 6:
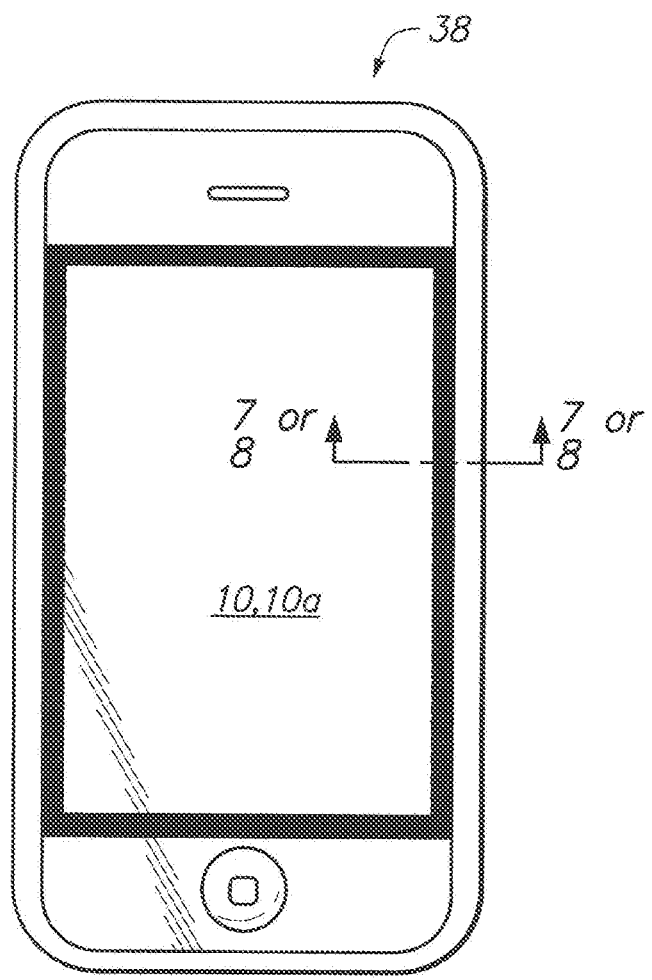
FIG. 6 is a top view of the electronic device shown in FIG. 1 with a shield having an opaque border for hiding air bubbles.
Figure 7:
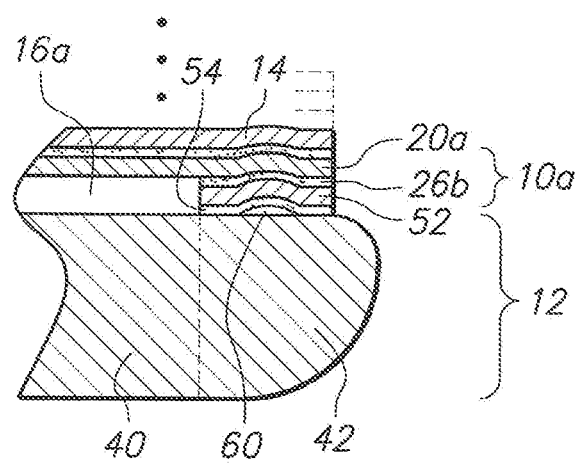
FIG. 7 is a cross sectional view of a first embodiment of a shield with an opaque border attached to the electronic device shown in FIG. 6.
Figure 8:
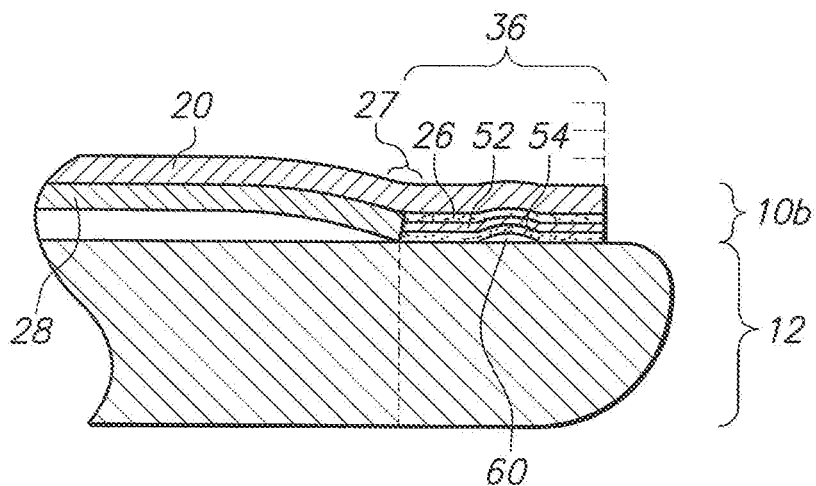
FIG. 8 is a cross sectional view of a second embodiment of a shield with an opaque border attached to the electronic device shown in FIG. 6.

Referring now to FIGS. 6-8, an opaque annular film 52 may be interposed between the outer peripheral portion 36 of the base transparent layer 20, 20a and the touch sensitive screen 12. The opaque annular film 52 may be incorporated into the shields 10, 10a discussed in relation to FIGS. 2-5. The opaque annular film 52 may be black, dark color, patterned, etc. so long as the pattern or color hides or mitigates visibility of air bubbles 60. The annular film 52 may take on various other configurations, as shown and described herein with respect to FIGS. 12A-16B. The opaque transparent layer 52 hides any air bubbles 60 that may exist when attaching the shield 10, 10a to the touch sensitive screen 12. FIG. 6 illustrates a black border. However, upon further inspection of the border area in FIGS. 7 and 8, an air bubble 60 exists between the shield 10, 10a and the touch sensitive screen 12. Nonetheless, due to the opaque annular film 52, such air bubble 60 is not noticeable or is not as noticeable when viewing the touch sensitive screen 12.

More particularly, referring now to FIG. 7, the shield 10a may have an adhesive 26b disposed about the outer peripheral portion 36 of the base transparent layer 20b. The opaque annular film 52 may be attached to the base transparent layer 20b by way of the adhesive 26b. Adhesive 54 may now be coated, sprayed or disposed onto the bottom surface of the opaque annular film 52 for attachment of the shield 10a to the touch sensitive screen 12. The adhesive 26b may be thin so as to not appreciably add to the thickness of the base transparent layer 20. Alternatively, the adhesive 26b or 54 may be thick such as in the embodiment disclosed in FIGS. 4-5. Nonetheless, the film 52 and/or the adhesive 26b, 54 may independently or collectively be sufficiently thick so that the air gap 16a may be formed between the shield 10a and the touch sensitive screen 12.

Sacrificial layers 14a-n may be stacked on top of the base transparent layer 20a as discussed above in relation to FIGS. 2-5.

Referring now to FIG. 8, the shield 10 may also have an opaque annular film 52. The opaque annular film 52 may be disposed at the outer peripheral portion 36 of the base transparent layer 20. Preferably, the opaque annular film 52 and the adhesive 26, 54 is thinner than the protective liner 28, and more particularly, is thinner than the central portion 48 of the protective liner 28. The step 27 is formed at the outer peripheral edge of the protective liner 28. The step 27 is formed at the outer peripheral edge of the protective liner 28. The opaque annular film 52 shown in FIG. 8 is attached to the base transparent layer 20 by way of adhesive 26. Adhesive 54 may be applied to the underside of the opaque annular film 52 to attach the shield 10 to the touch sensitive screen 12. Sacrificial layers 14a-n may also be stacked on top of the base transparent layer 20 as discussed above in relation to FIGS. 2-5.

An index of refraction of the adhesive and the transparent material which forms the sacrificial layers 14a-n, base transparent layer 20 and the protective liner 28 may have a refraction mismatch of 0.2 to minimize unwanted internal reflection, haze, maximize transmissions and contrast of the screen and to maintain the high brightness and contrast of the visual objects displayed on the touch sensitive screen 12. It is also contemplated that the upper surface of each of the sacrificial layers 14 and the exposed side 22 of the base transparent layer 20 may have a thin hard coating. The adhesive that attaches each of the sacrificial layers 14 together as well as the stack of sacrificial layers 14 to the base transparent layer 20 may be provided so that the peel strength is the same throughout the stack. Alternatively, the bottom most layer 14, 20 may have a higher peel value than the layers 14 above the bottom most layer 14, 20. In this manner, as the topmost sacrificial layer 14 is peeled from the lower sacrificial layers 14, the act of peeling the topmost sacrificial layer 14 does not also peel the lower sacrificial layers 14. The peel strength may range between about 25 to about 300 grams/inch. The adhesive discussed herein may be permanently attached to the layer immediately above the adhesive. Accordingly, when the topmost sacrificial layer 14 is peeled, no residue of the adhesive is left on the layer below. The exposed or top side of the fresh sacrificial layer 14 mostly, if not entirely is free from adhesive. Additionally, when all of the sacrificial layers 14 are removed from the shield 10, no adhesive residue is left on the exposed side 22 of the base transparent layer 20.

Each of the sacrificial layers 14, base transparent layer 20 and the protective layer 28 may have a thickness between about 1 mil to about 7 mil with each mil being 0.001" thick. Unless otherwise stated, the adhesive layer attaching the sacrificial layers 14 to each other as well as the sacrificial layers 14 to the base transparent layer 20 may add negligible thickness to the shield 10, 10a. By way of example and not limitation, if each of the sacrificial layers 14, the base transparent layer 20 and the protective layer 28 have a thickness of 2 mil, then the total thickness of the shield 10 may be 8 mil thick provided that there are only two sacrificial layers 14 and one base transparent layer 20 and one protective liner 28.

Figure 9:
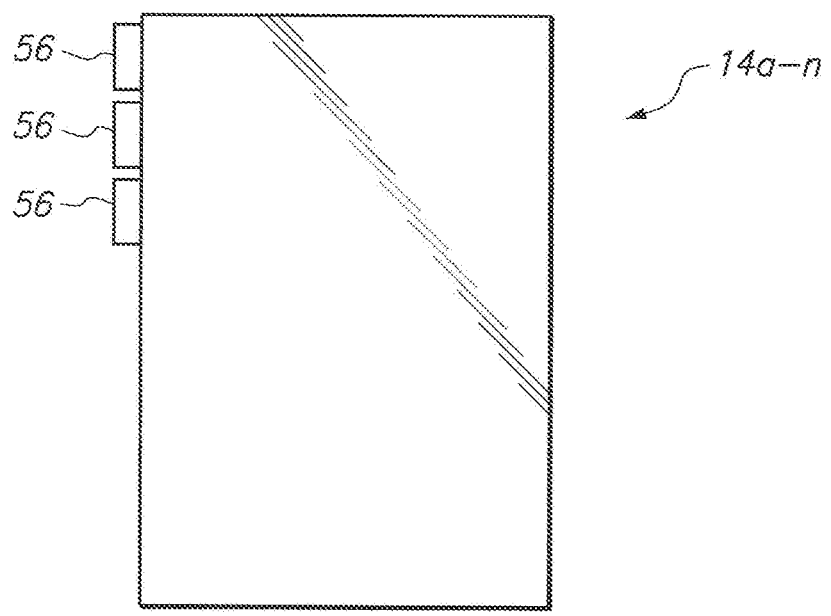
FIG. 9 is a top view of a stack of sacrificial layers with tabs for peeling a topmost layers, the stack being mountable to the shield shown in FIGS. 1-8.

The sacrificial layers 14a-n may be stacked upon each other. Preferably, the sacrificial layers may be generally coextensive with each other so that the stack of sacrificial layers 14a-n appear to be a single film. As discussed above, in order to assist in the peeling of only the top most sacrificial layer 14 while leaving the lower sacrificial layers 14 in place, the adhesive peel strength may be adjusted to be the weakest at the top most sacrificial layer and stronger as the top most sacrificial layer is peel away. Alternatively, or additionally, tabs 56 which are shown in FIG. 9 may be formed as part of the sacrificial layers 14. Each of the sacrificial layers 14a-n may be formed with the tab 56 that extends outward as shown in FIG. 9. No adhesive is formed on the area of the tab 56. Each of the tabs 56 may be offset or staggered with the tabs 56 of the other sacrificial layers so that the user can pull the tab 56 of the then top most sacrificial layer at the time to peel off the top most sacrificial layer 14. Other tabbing systems known in the art may be incorporated such as those shown and described in relation to Japanese Kokai Patent Publication Number 4-314537 and U.S. Pat. No. 6,777,055.

Figure 10:
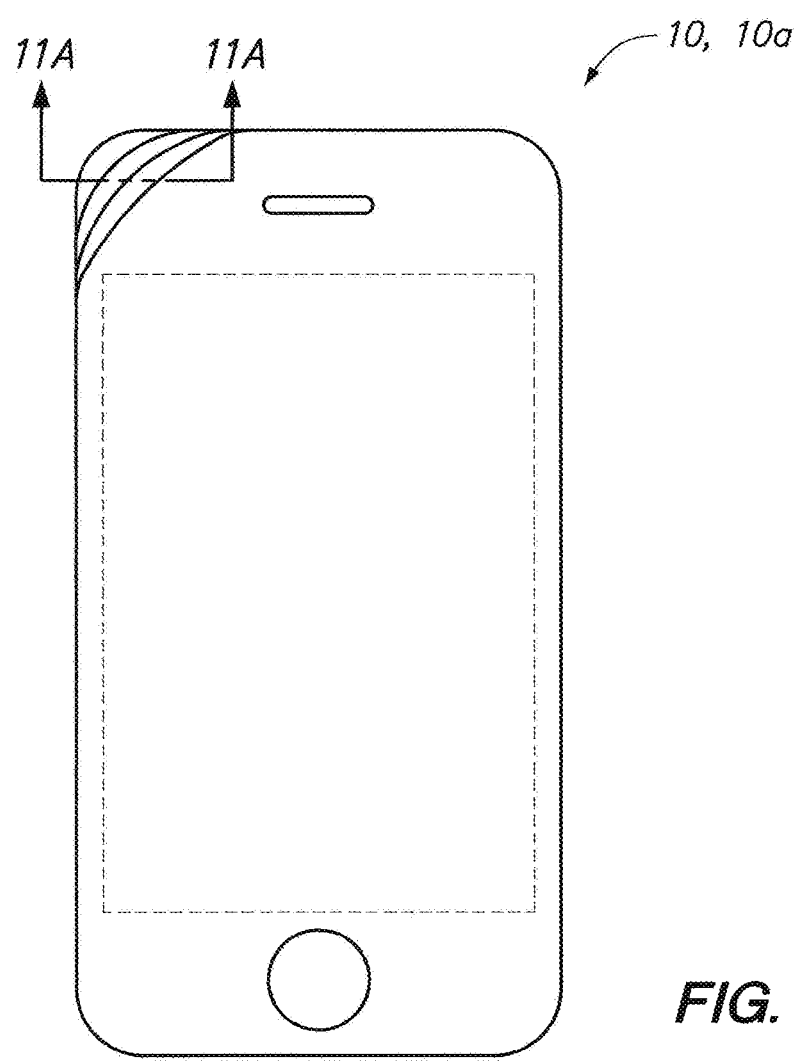
FIG. 10 is a top view of a stack of sacrificial layers with a stair step configuration for peeling a topmost layer, the stack being mountable to the shield shown in FIGS. 1-8.
Figure 11A:
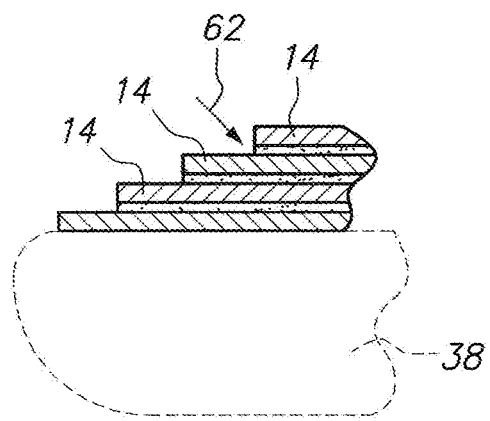
FIG. 11A is a cross sectional view of the stair step shown in FIG. 10.
Figure 11B:
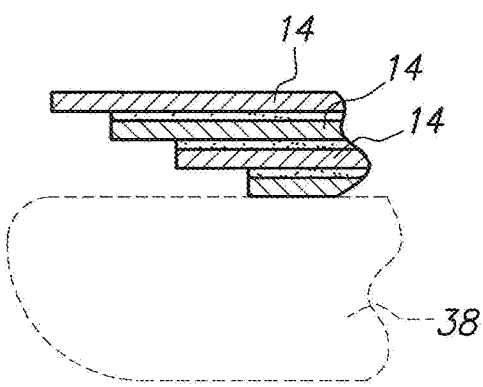
FIG. 11B is an alternative arrangement to the stair step show in FIG. 11A.

Additionally or alternatively, a peel assist system shown in FIGS. 10-11B may be incorporated into the shield 10, 10a. By way of example and not limitation, a corner of the shield 10, 10a may have a stair step configuration. Although the upper left corner of the shield 10, 10a is shown as having the stair step configuration, any of the other corners, upper right, lower left and/or right corners may have the stair step configuration. A first configuration of the stair step is shown in FIG. 11A. Sacrificial layers 14 may be peeled off layer by layer. The top most sacrificial layer 14 may be peeled off with the aid of a sharp blade or fingernail that digs between the first and second top most layers 14 as shown by arrow 62 to initiate peeling of the top most layer 14. FIG. 11B illustrates a second configuration of the stair step configuration. The stair step configuration is reverse compared to the stair step configuration shown in FIG. 11A. The user may lift the top most layer 14 with his or her finger since the top most layer 14 extends over the rest of the stack of layers 14. The shield 10, 10a has been shown generically attached to the electronic device 38 for the purposes of clarification. However, any of the attachment methods discussed herein may be implemented in the shield 10, 10a embodiments shown in FIGS. 10-11B.

Certain embodiments of the shield 10 above were directed to a multi-layer shield 10. Either the base transparent layer 20 was adhered to a lower protective layer 28 and/or one or more sacrificial layers 14a-n. These layers 20, 28, 14a-n are each adhered to each other. The layers 20, 28, 14a-n and the adhesive may absorb impact shock caused when the electronic device 38 is dropped or the touch sensitive screen 12 hits a solid object. The impact is reduced at each adhesive interface where the softer adhesive may yield and spread out the impact force laterally instead of proceeding directly into the glass of the touch sensitive screen. Additionally, the stacked construction of the shield 10 and the sacrificial layers 14a-n retain the flexibility or bendability of the layers to maintain the tactile response for the touch sensitive screen.

Preferably, the base transparent layer 20, protective layer 28, and sacrificial layers 14 are fabricated from biaxially oriented polyethelene terephalate material (boPET).

Referring back to FIG. 1, the various embodiments of the shield and sacrificial layers disclosed herein may be enlarged to cover the front surface of the electronic device 38. An example of the enlarged shield is shown in FIG. 1 in hidden lines. Cutouts 58 may be made through the shield to allow for physical buttons and speakers on the electronic device 38.

In lieu of the opaque annular film 52, it is also contemplated that the base transparent layer 20, 20a may have an opaque printed border which serves the same function as the opaque annular film 52. The opaque border on the base transparent layer 20, 20a may be formed by a screen printing, etc. or other methods known in the art. It is also contemplated that the adhesive 26, 26a, 26b, 54 may be colored so as to be opaque and hide the air bubbles 60.

This application describes examples of shields for a touch screen device that removably attach to a touch screen in a manner that maintains touch screen sensitivity between the shield and the touch screen, without having the central portion of the shield adhere to the active area of the touch screen (e.g., a portion of the touch screen that serves as a primary display). Certain embodiments described herein utilize an opaque annular film as a way to hide air bubbles or other undesirable optical artifacts between the shield, the adhesive layer, and the touch sensitive screen. In some examples, this annular layer may be provided with a pattern that changes the appearance of the touch screen device. The pattern may include different shapes, colors, or designs so as to give a different ornamental appearance to the touch screen device. FIGS. 12A and 12B show examples of annular layers 200 and 202 printed with different patterns. For instance, the pattern may include a design that involves one or more colors or a variety of shapes, as shown in the pattern 200 of FIG. 12A. The pattern may include an image, such as a graphical image or a photograph. The pattern may include text, such as letters, numbers, and/or symbols. The pattern can include symbols that correspond to symbols on the inactive portion of the touch screen that is otherwise covered by the annular layer. For instance, the pattern may include images that represent the "back" or "menu" buttons that can be found on the inactive border areas of some touch screen devices. The pattern may also include logos or other shapes associated with various brands or organizations, as shown in the Racing Optics® pattern 202 of FIG. 12B. In this way, the pattern can be used as a form of promotion or marketing. For example, shields can be provided with patterns reflecting logos, designs, or color patterns that represent businesses, sports teams, product lines, and the like. In this way when a user looks at a touch screen device protected by such a shield, the user views the logo and identifies with the entity represented by the logo, design, pattern, etc.

Generating patterns on a touch screen shield can result in undesirable effects. For example, printing patterns on an outer surface of a shield will leave the printed pattern exposed to wear and tear. The printed pattern will be exposed to wear from a variety of sources, for example, from fingers operating the touch screen device, from materials rubbing against the device in a pocket or purse, or a variety of other factors. Accordingly, the presently described shields that incorporate patterns in a manner that provides protection against this normal wear and tear. In particular, this application describes shields with printed patterns that are protected underneath an upper surface of the shield. Because the base layer can be seen through, the pattern can be essentially just as visible to a user as if it were printed on the top surface of the shield, but without being exposed to damaging environmental factors.

Figure 13A:
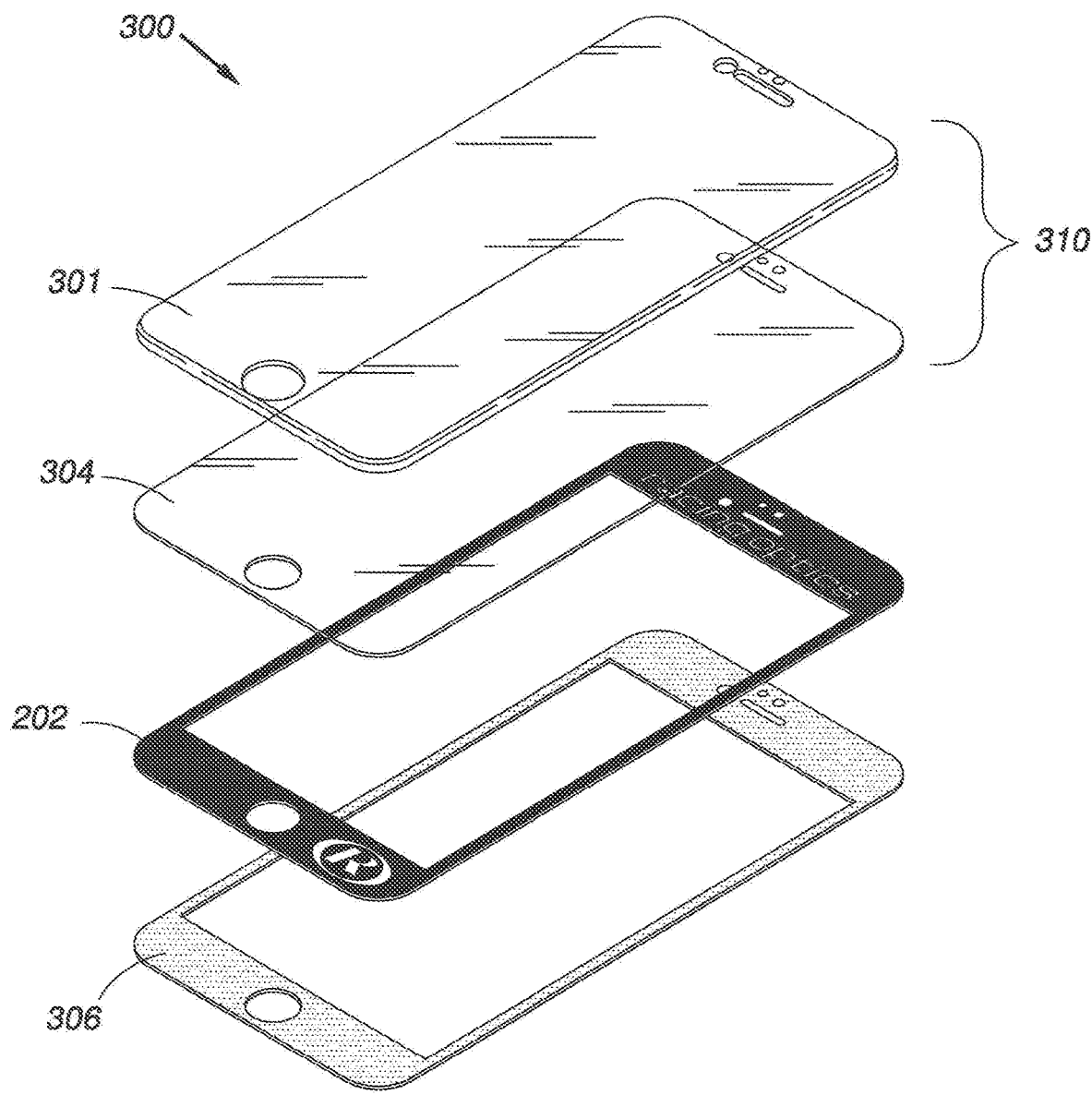
FIGS. 13A and B show an exploded view and a cross sectional view, respectively, of a multi-layered shield having an annular layer with a printed pattern.
Figure 13B:
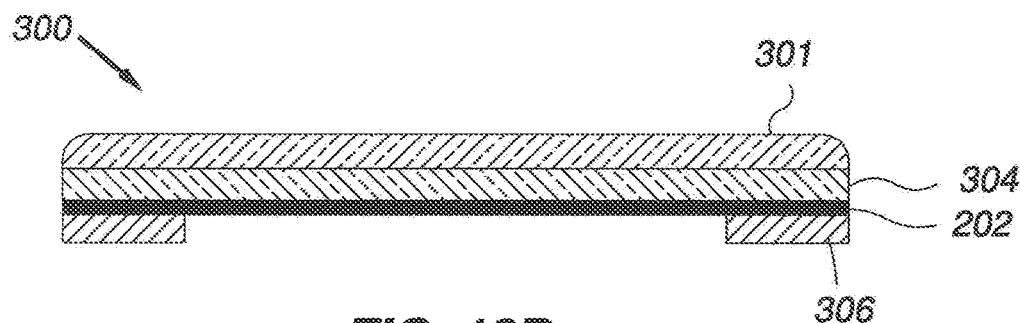

One way of protecting a printed pattern is to utilize an annular layer, for example, the opaque annular layer 52, as shown and described herein. Some of the embodiments described herein utilize the annular layer to hide air bubbles and other artifacts, while also inhibiting the central portion of the shield from adhering to the active area of the touch screen. Since this annular layer is already employed to serve these additional purposes, it can simultaneously be used to provide a surface for printed patterns as described herein. FIG. 13A shows a shield 300 in an exploded form to show the various layers that make up the shield. FIG. 13B is a cross section of the assembled shield 300.

As shown in FIGS. 13A and 13B, the shield comprises a base layer 310 formed from an upper layer 301 and a lower layer 304 laminated together. The upper layer 301 may be a layer formed from plastic (e.g., PET), and can include a hard coat on the upper surface. In some examples, the upper layer 301 can include a beveled edge, as shown in FIGS. 13A and 13B. The lower layer 304 may also be formed from a plastic material, such as PET, but can also be formed from more rigid materials, such as glass. The lower layer 304 can be laminated or otherwise adhered to the upper layer 301, and can be configured to form a strong bond with the first layer 301. The "strong bond" is designed so that the two layers will not typically remain together, and will not delaminate or separate as a result of typical use. The strong bond may be considered a permanent, or near permanent bond, though under some conditions or after significant wear, delamination may be possible. Generally speaking, the strong bond between the two layers forming the base layer 310 is stronger than the removable bond that attaches the shield 300 to the touch screen. In some formats, the base layer 310 may only comprise a single layer, and may not include an upper multiple layers as shown in FIGS. 13A and 13B.

The shield 300 also includes a patterned annular layer 202 adhered to the underside of the base layer. The patterned annular layer 202 may have a shape that corresponds to an inactive portion of a touch screen, such as a border or other portion that surrounds the active or display portion of the touch screen. The patterned annular layer 202 may be printed with multiple colors, shapes, images, photographs, text, logos, or other patterns as described herein. The patterned annular layer 202 is be adhered and/or laminated to the base layer 310 via another adhesive layer (not shown, as it may be of negligible thickness) to form yet another strong bond, which adhesive may have a refractive index that matches the refractive index of the base layer 310 (e.g., matched to within 0.2, 0.1, or 0.02) and the adhesive bonding the base layer together. The index matching can help maintain high visibility of the printed pattern through the base layer 310 and any intermediary adhesives.

An attaching adhesive layer 306 is applied about the back side of the annular layer 200. In FIG. 13A, the attaching adhesive layer 306 has a shape that corresponds essentially with the shape of the annular layer 202, but in some forms the adhesive may have a different shape. For instance, the attaching adhesive layer 306 may form a narrow bead on the patterned annular layer 202 without being applied to the entire undersurface thereof. The attaching adhesive layer 306 can be configured to allow the shield to removably attach to a touch screen surface. For example, the attaching adhesive layer 306 can be configured to hold the shield on a touch screen, while still allowing it to be removed from the touch screen for replacement. In some examples, the adhesive layer 306 is configured to remain with the shield, so that little to no residue is left behind on the touch screen when the shield is removed. In FIGS. 13A and B, the attaching adhesive layer 306 is applied about the patterned annular layer 202, but not along the base layer 310 of the shield. In this way, the shield 300 can attach to a touch screen device without adhering to the central portion, or the active display area of the touch screen device, thereby inhibiting the formation of undesirable optical artifacts such as bubbles, while still allowing the touch screen to maintain touch sensitivity through the attached shield. Further, the printed pattern 202 can be visible through the base layer 310, while simultaneously being protected by the base layer 310 once installed on a touch screen device. Consistent with other embodiments described herein, the annular layer 202 and/or the attaching adhesive layer 306 can have a combined thickness that is sufficient to lift and or separate the lower surface of the base layer 310 from the active area of the touch screen to which it attaches.

Figure 14A:
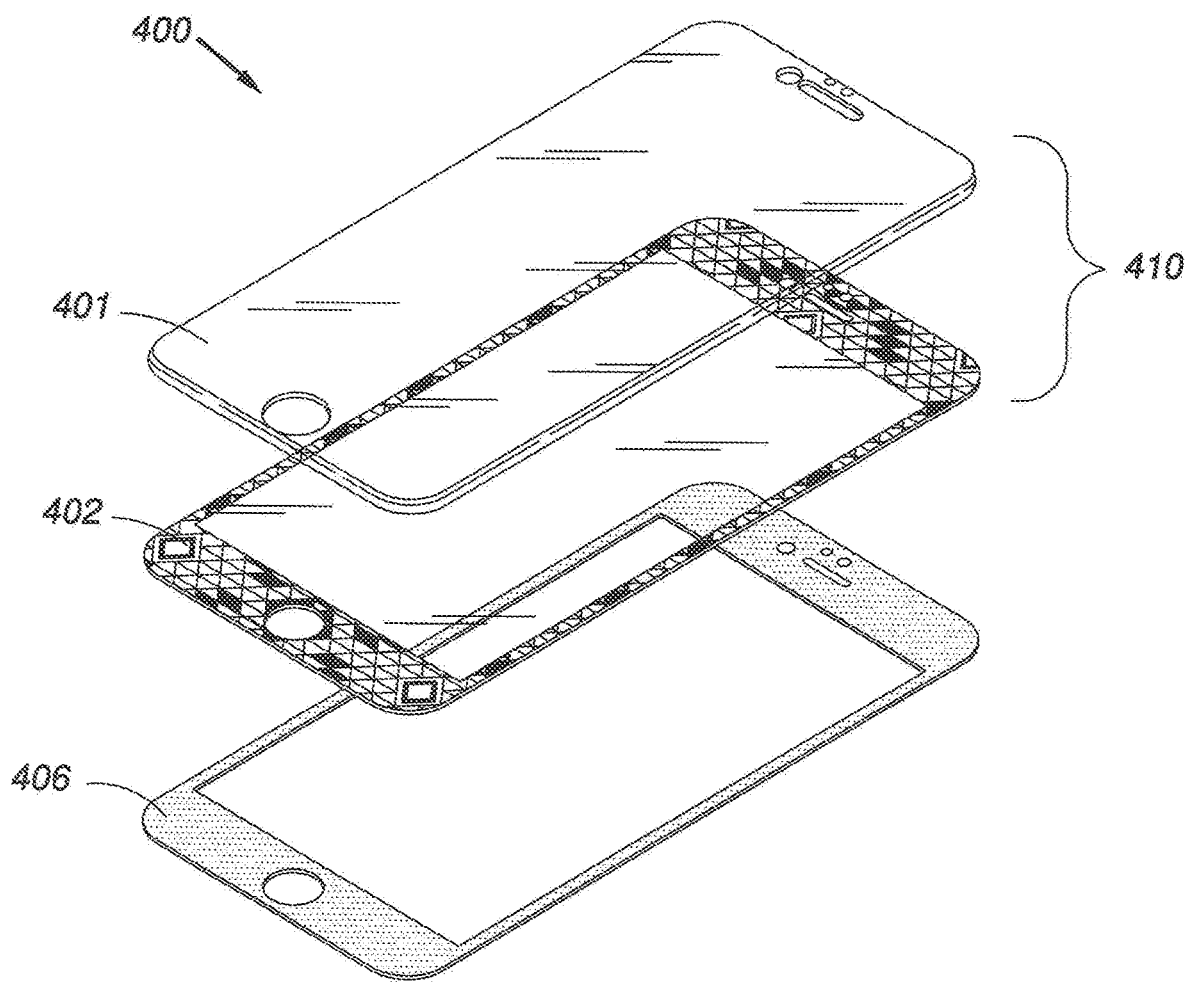
FIGS. 14A and B show an exploded view and a cross sectional view, respectively, of a multi-layered shield with a pattern printed on an inner surface of the shield.
Figure 14B:
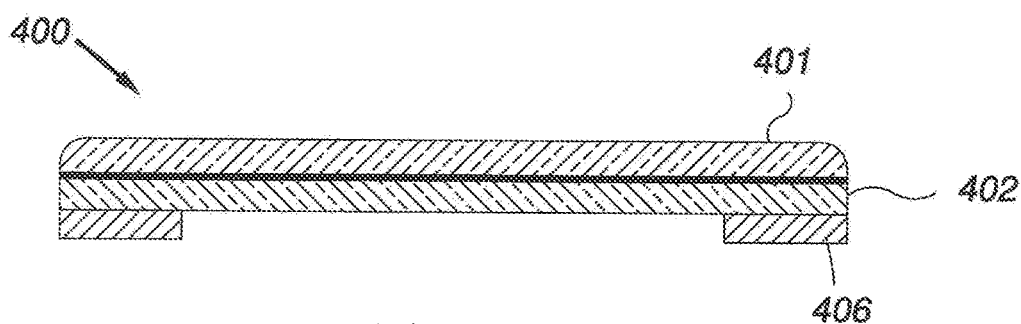

FIGS. 14A-16B show other configurations for providing a printed pattern on a shield in a manner that is protected by the base layer. In FIGS. 14A and 14B, like the shield 300 of FIGS. 13A and 13B, shield 400 also comprises a base layer 410 that includes an upper layer 401 laminated to a lower layer 401 via a strong bond. These two layers can be formed from a plastic material, such as PET, and may include a hard coat on the upper surface of the upper layer 401. The layers 401/402 may be flexible so that the shield 400 is flexible itself, but in some formats, either the upper layer 401, the lower layer 402, or both can be formed from a more rigid material, such as glass. A pattern is printed about an outer peripheral portion of the lower layer 402. This printed pattern may be configured to correspond to the inactive area of a touch screen device. For instance, the shape of the pattern can be arranged to correspond to a border portion of a touch screen device that surrounds an active or display area of the touch screen. The shield 400 has an adhesive layer 406 attached to the lower layer 402 of the shield, thereby allowing the shield to attach to a touch screen device. In some embodiments, adhesive layer 406 corresponds to or has the same shape as the pattern printed on the lower layer 402 of the shield 400. In other embodiments, the adhesive layer 406 may have a different shape or configuration, but is still designed to be underneath the printed pattern. For example, the adhesive layer 406 may only form a thin bead about a portion of the lower layer 402 of the shield.

Unlike the shield 300 of FIGS. 13A and B, shield 400 does not include an annular layer. Accordingly, the application of the adhesive layer 406 may be configured to lift or separate the central portion of the shield from the active area of the touch screen, or to generate an air gap. In particular, the adhesive layer 406 is applied so that the shield 400 can be attached to the touch screen without adhering the central portion of the shield to the active or display area of the touch screen (or, at least without adhering a majority of the shield to the active area). In some formats, a different adhesive pattern can be applied. For example, the adhesive layer 406 may be a full adhesive that is configured to apply to the entire surface of the touch screen without creating any separation, while still providing a printed border that is protected from wear by the upper surface of the shield 400. The shield 400 thus protects a touch screen while maintaining touch sensitivity of the touch screen, and providing a pattern that corresponds with a border or inactive edge of a device.

Figure 15A:
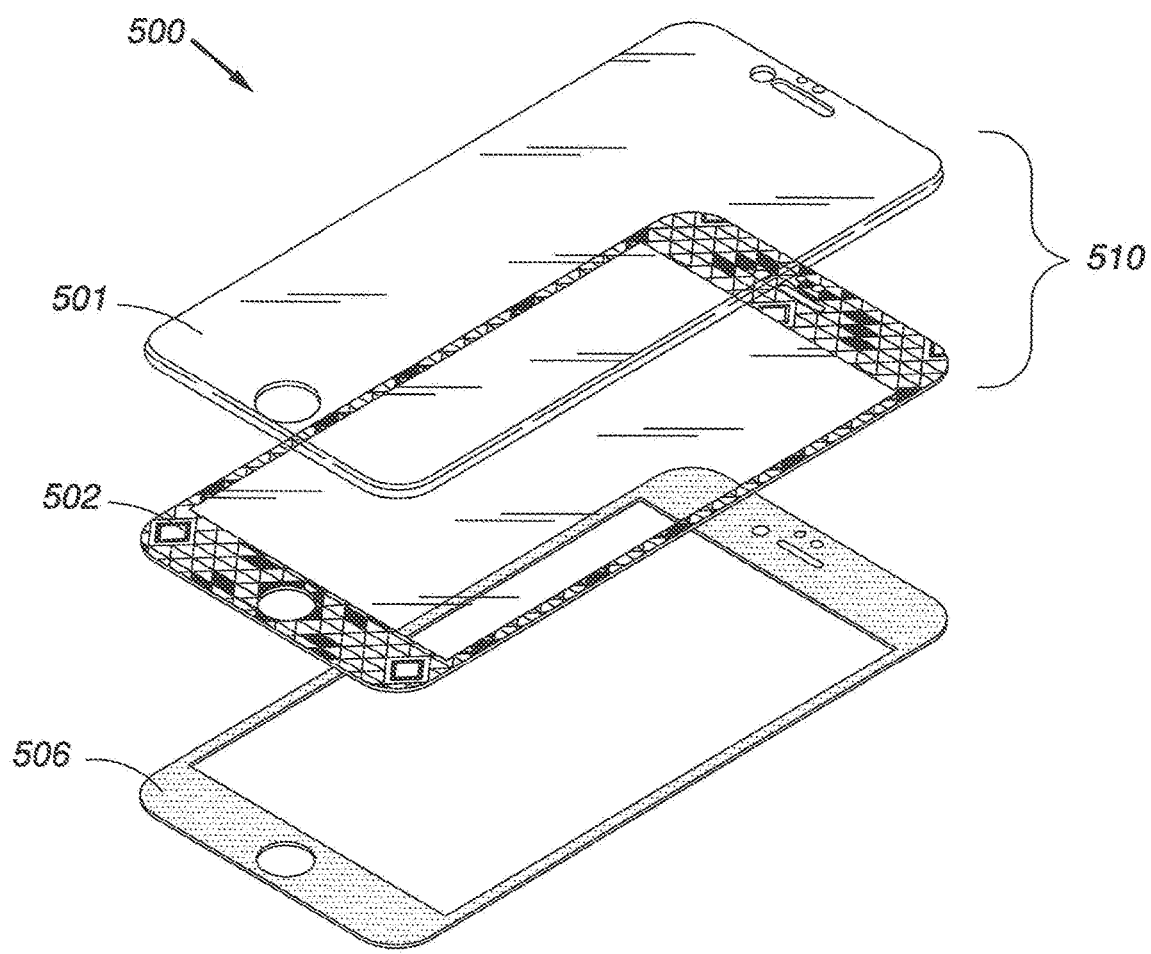
FIGS. 15A and B show an exploded view and a cross sectional view, respectively, of a shield with a pattern printed on a lower surface of the shield.
Figure 15B:
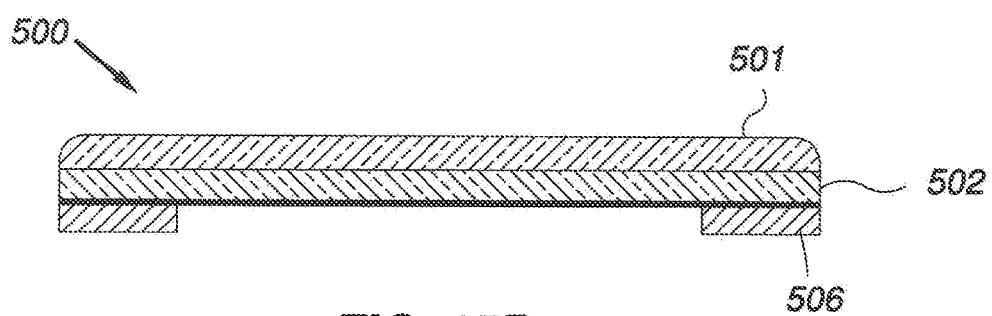

FIGS. 15A and 15B show another embodiment of a shield 500 with a pattern, where the pattern is printed on the lower surface of a base layer 510. In this embodiment, the pattern is reverse printed on the lower surface of the base layer 510. In a shield employing a multi-layered base layer 510, the pattern can be reverse printed on either the lower side of either the first layer 501 or the lower layer 502, but as shown in FIG. 15A, the pattern is reverse printed on the lower surface of the lower layer 502. Reverse printing generally involves printing the pattern as a mirror-image of the intended pattern, so that when the pattern viewed form the top of the base layer (e.g., the surface of the shield facing a user when installed on a device), the pattern appears in its normal form. Like with the embodiment of FIGS. 14A and 14B, the shield 500 has an attaching adhesive layer 506 applied to a lower surface of the shield so as to make the shield removable attachable to a touch screen. The attaching adhesive layer 506 can be applied to the shield 500 in a shape or pattern that corresponds to the inactive area of the touch screen, as shown in FIG. 15A, or it can be applied in another manner, such as a narrow bead around the perimeter of the shield, or as a full adhesive about the majority of the underside of the shield 500. In any form, the shield 500 protects the touch screen while maintaining touch sensitivity of the touch screen, and also provides a pattern that corresponds with a border, edge, or peripheral area of the touch screen device.

Figure 16A:
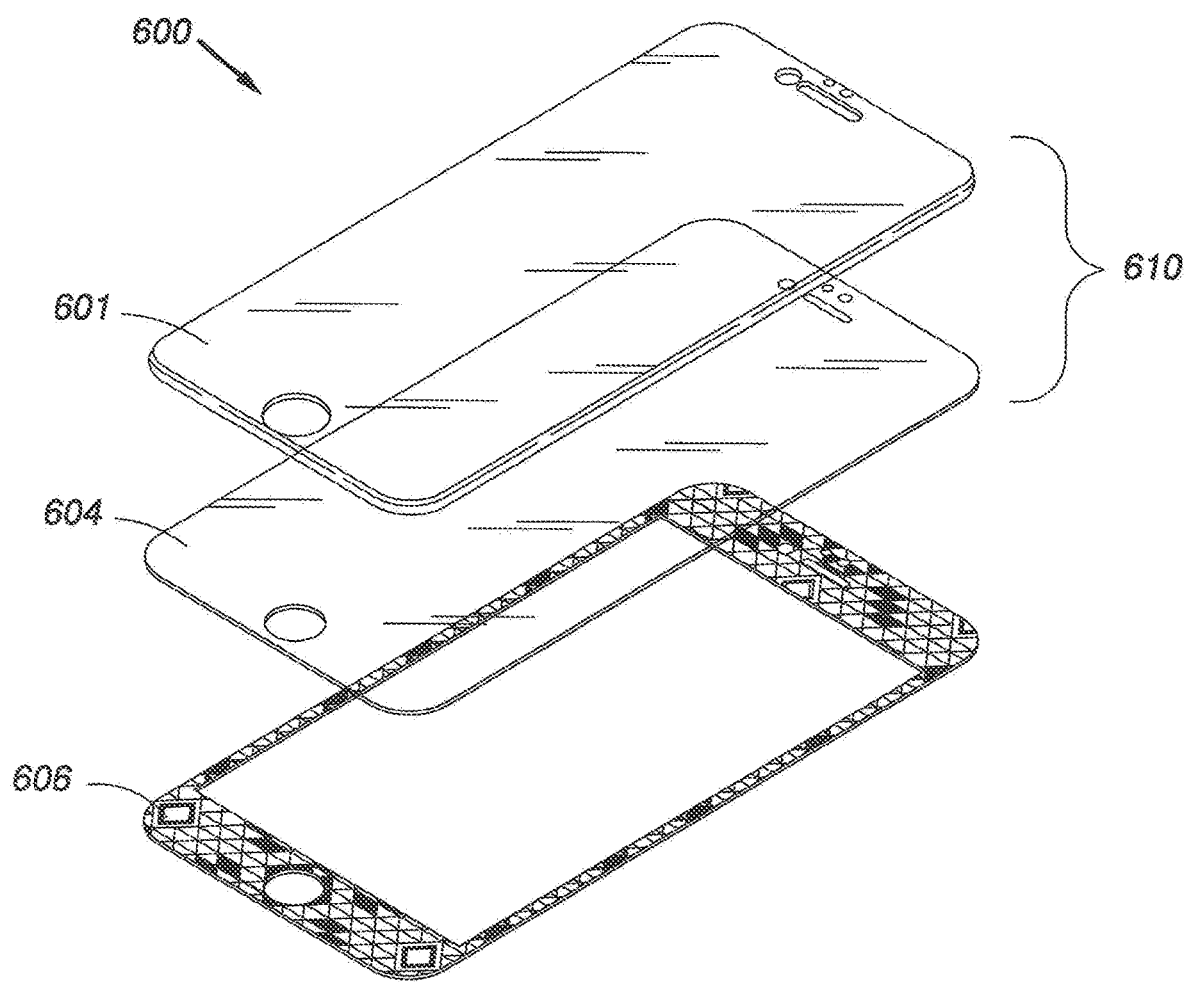
FIGS. 16A and B show an exploded view and a cross sectional view, respectively, of a shield with an attaching adhesive that exhibits a pattern.
Figure 16B:
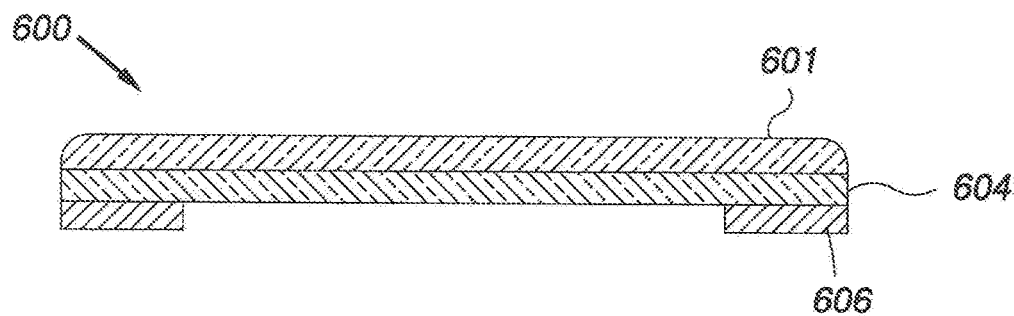

The patterns of FIGS. 12A-15B are described as being printed on a layer, such as a sub-layer of a multi-layered shield or on an annular layer of a shield. FIGS. 16A and 16B show an example of a shield 600 where the adhesive 606 itself may form a portion of the pattern. For example, the shield 600 includes a base layer 610, which can be formed from an upper layer 601 strong bonded to a lower layer 604 in a manner similar to that described herein with respect to FIGS. 12A-15B. The shield 600 includes an attaching adhesive 606 that may use colored or shaded adhesives, or that may utilize a variety of different colored and/or shaded portions in the adhesive to generate a pattern. The pattern of the adhesive can be applied in a reverse printing manner. In this way, the attaching adhesive layer 606 can present a pattern that is protected by, and viewable through the base layer 610 of the shield 600.

FIGS. 12A-16B show examples of touch screen shields that utilize patterns around a perimeter or peripheral edge of the shield. In the examples described herein, the patterns are described to correspond to the inactive border area of the touch screen device that the shields are designed to attach to. That is, the patterns are designed to correspond to a portion of a mobile phone or other touch screen device that is typically not used as the primary active display of the touch screen device. However, it is also contemplated that some embodiments may employ patterns that extend over at least a portion of a primary display area. In some formats the patterns may be translucent so as not to obstruct the viewability of the touch screen. For instance, the patterns may form holograms or watermarks that present information or designs without obstructing or significantly obstructing the display. Additionally, FIGS. 13A-16A show four different shields, each of which comprises a base layer formed of multiple layers laminated together. It should be understood that the patterns described herein could also be applied to shields having a single base layer. For example, the patterns can be printed directly on a lower surface of the single base layer (e.g., using reverse printing), or a patterned annular layer could be applied to the lower surface of the single-layered shield. Regardless of how the patterns are applied, or what type of material they are applied to, they are protected in some form by an upper surface or upper layer of the shield. This protection inhibits wear and tear on the pattern, allows the touch screen to maintain touch sensitivity through the attached shield, and covers up or hides bubbles that form underneath the pattern between the shield, the adhesive, and the touch screen device.

The above description is given by way of example, and not limitation. Given the above disclosure, one skilled in the art could devise variations that are within the scope and spirit of the invention disclosed herein, including various ways of forming the slit for the annular ring. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A shield for a touch sensitive screen of a device, the shield comprising:
    a transparent layer defining opposed first and second sides, the transparent layer defining a transparent central portion and an outer periphery having, indicia thereon;
    a layer of pressure sensitive adhesive disposed about an outer peripheral portion of the second side of the transparent layer;
    wherein the outer peripheral portion of the transparent layer is attachable to the device so that the central portion of the second side of the transparent layer is positioned on top of the touch sensitive screen of the device to form an air gap between the central portion of the transparent layer and the touch sensitive screen of the device.

2. A shield for protecting a touch screen that defines an active area disposed within an inactive area, the shield comprising:
    a base layer having a shape that corresponds to the touch screen, the base layer defining opposing first and second sides;
    an annular layer attached to the second side of the base layer, the annular layer having a shape that corresponds to the inactive area of the touch screen and that defines a central portion of the shield that corresponds to the active area of the touch screen, the annular layer having a first surface attached to the second side of the base layer and an opposing second surface;
    a first adhesive layer disposed on the second surface of the annular layer and extending about an outer peripheral portion of the base layer;
    wherein the base layer, the annular layer, and the first adhesive layer are configured to attach the shield to the touch screen without adhering the central portion of the shield to the active area of the touch screen and so that the active area of the touch screen is visible through, the central portion of the base layer, and wherein the first surface of the annular layer comprises a pattern.

3. The shield of claim 2, wherein the pattern is opaque so that the annular layer hides air bubbles formed between the attached shield and the touch screen.

4. The shield of claim 2, wherein the pattern is printed on the first surface of the annular layer.

5. The shield of claim 4, wherein the pattern is formed by screen printing on the first surface of the annular layer.

6. The shield of claim 2, further comprising a second adhesive layer adhering the first surface of the annular layer to the second side of the base layer.

7. The shield of claim 6, wherein the second adhesive layer is transparent so that the pattern on the first surface of the annular layer is visible through the base surface of the shield.

8. The shield of claim 7, wherein the base layer and the second adhesive layer each have an index of refraction, wherein the difference in the index of refraction between the base layer and the second adhesive layer is less than 0.2.

9. The shield of claim 2, wherein the pattern comprises a dark color.

10. The shield of claim 2, wherein the pattern is solid black.

11. The shield of claim 2, wherein the pattern is multi-colored.

12. The shield of claim 2, wherein the pattern comprises at least one of a graphical image, a photographical image, and text.

13. The shield of claim 2, wherein the pattern comprises symbols that correspond to touch sensitive operations on the inactive portion of the touch screen.

14. The shield of claim 2, wherein the base layer is configured to inhibit wear to the pattern of the annular layer.

15. The shield of claim 2, wherein the shield is configured so that touch sensitive portions of the inactive area and the active area maintain touch sensitivity through the attached touch screen.

16. The shield of claim 2, wherein the shield is configured so that the touch screen maintains touch sensitivity through the attached shield.

17. The shield of claim 2, the annular layer and the first layer of adhesive have a combined thickness sufficient to lift the second side of the base layer off the active area of the touch screen.

18. The shield of claim 2, wherein the first adhesive layer is configured so that the shield may be removed from the touch screen and replaced with a new shield.

19. The shield of claim 2, wherein a majority of the active area and the inactive area of the touch screen share a common plane, and wherein the second side of the base layer of an attached shield is in a different plane from that shared by the majority of the active area and the inactive area.

20. The shield of claim 2, wherein the base layer is formed from a flexible material.

21. A protective shield for a touch sensitive screen of an electronic device, the touch sensitive screen enabling touch operation of the electronic device, and the touch sensitive screen having an active area that comprises a touch sensitive visual display and an inactive area, the shield comprising:
    a base layer defining opposed first and second sides, the base layer having a shape that corresponds to a shape of the touch sensitive screen, the base layer defining a central portion that has a shape corresponding to the active area of the touch sensitive screen and an outer peripheral portion that corresponds to a shape of the inactive area of the touch sensitive screen;
    an annular layer disposed about the outer peripheral portion of the second side of the base layer, the annular layer having a shape that corresponds to the inactive area of the touch sensitive screen and defining opposed first and second sides the annular layer surrounding the central portion of the base layer; and a layer of pressure sensitive adhesive disposed on the second side of the annular layer and extending about the outer peripheral portion of the base layer;

wherein the shape of the base layer and the disposed layer of pressure sensitive adhesive are configured to attach the shield to the touch sensitive screen of the device so that the central portion of the second side of the base layer is positioned over the active area of the touch sensitive screen of the device, and so that the attached shield forms an air gap between the central portion of the base layer and the touch sensitive screen of the device, wherein the shield is configured so that the touch sensitive screen maintains touch sensitivity through the attached shield, wherein the annular layer comprises an opaque pattern to hide air bubbles formed between the attached shield and the device, and wherein the annular layer is patterned.

\* \* \* \* \*